(12) United States Patent
Fei et al.

(10) Patent No.: US 11,582,555 B2
(45) Date of Patent: Feb. 14, 2023

(54) SMART AUDIO SYSTEM CAPABLE OF DETERMINING SPEAKER TYPE AND POSITION

(71) Applicant: PixArt Imaging Inc., Hsin-Chu County (TW)

(72) Inventors: Ming Shun Manson Fei, Hsin-Chu County (TW); Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 17/490,532

(22) Filed: Sep. 30, 2021

(65) Prior Publication Data
US 2022/0030356 A1 Jan. 27, 2022

Related U.S. Application Data

(63) Continuation of application No. 16/814,229, filed on Mar. 10, 2020, now Pat. No. 11,172,297, which is a continuation-in-part of application No. 16/398,778, filed on Apr. 30, 2019, now Pat. No. 11,137,770.

(51) Int. Cl.
| | |
|---|---|
| H04R 3/12 | (2006.01) |
| H04R 27/00 | (2006.01) |
| H04R 29/00 | (2006.01) |
| H04R 1/40 | (2006.01) |
| G06F 3/16 | (2006.01) |
| H04R 3/00 | (2006.01) |

(52) U.S. Cl.
CPC ............ *H04R 3/12* (2013.01); *G06F 3/165* (2013.01); *H04R 1/403* (2013.01); *H04R 1/406* (2013.01); *H04R 3/005* (2013.01); *H04R 27/00* (2013.01); *H04R 29/002* (2013.01); *H04R 2227/005* (2013.01); *H04R 2420/05* (2013.01); *H04R 2420/07* (2013.01)

(58) Field of Classification Search
CPC ...... G06F 3/167; H04N 21/4223; G10L 15/22
USPC ...................................... 381/56, 58
See application file for complete search history.

(56) References Cited

U.S. PATENT DOCUMENTS

| | | |
|---|---|---|
| 2012/0075058 A1 | 3/2012 | Takenaka et al. |
| 2015/0039105 A1 | 2/2015 | Lee |
| 2015/0142140 A1 | 5/2015 | Yamaguchi et al. |
| 2015/0156030 A1 | 6/2015 | Fadell et al. |
| 2015/0283036 A1 | 10/2015 | Aggarwal et al. |
| 2016/0005229 A1* | 1/2016 | Lee .................. G06T 11/60 345/419 |
| 2017/0169185 A1 | 6/2017 | Weng |
| 2017/0300665 A1 | 10/2017 | Wei |
| 2018/0048230 A1 | 2/2018 | Park et al. |
| 2018/0121629 A1 | 5/2018 | Dyer et al. |
| 2019/0028290 A1 | 1/2019 | Jeong |
| 2019/0065980 A1 | 2/2019 | Yamaguchi et al. |
| 2019/0281878 A1 | 9/2019 | Tang et al. |
| 2020/0028730 A1 | 1/2020 | Fan |

(Continued)

*Primary Examiner* — George C Monikang
(74) *Attorney, Agent, or Firm* — WPAT, PC

(57) ABSTRACT

There is provided a smart audio system including multiple audio devices and a central server. The central server confirms a model of every audio device and a position thereof in an operation area in a scan mode. The central server confirms a user position or a user state to accordingly control output power of a speaker of each of the multiple audio devices in an operation mode.

20 Claims, 8 Drawing Sheets

(56) References Cited

U.S. PATENT DOCUMENTS

2020/0085105 A1 3/2020 Barbaric et al.
2020/0085694 A1 3/2020 Patel et al.
2020/0345588 A1 11/2020 Merrell et al.

* cited by examiner

|  | signal strength | signal time | event position |
|---|---|---|---|
| sensor I | | $t_0$ | ○ |
| sensor II | | | ✕ |
| sensor III | | $t_1$ $t_2$ $t_3$ | ✕ |

FIG. 5A

SMART AUDIO SYSTEM CAPABLE OF DETERMINING SPEAKER TYPE AND POSITION

CROSS REFERENCE TO RELATED APPLICATION

The present application is a continuation application of U.S. patent application Ser. No. 16/814,229 filed on, Mar. 10, 2020, which is a continuation-in-part application of U.S. patent application Ser. No. 16/398,778 filed on, Apr. 30, 2019, the disclosures of which are hereby incorporated by reference herein in their entirety.

BACKGROUND

1. Field of the Disclosure

This disclosure generally relates to a smart detection system and, more particularly, to a smart detection system applicable to smart home that includes multiple sensors having identical or different sensor types.

2. Description of the Related Art

The smart home is a part of a smart city. However, in addition to controlling home appliances and lamps in the smart home, how to determine a target to be controlled and a position thereof depends on the detection of sensors. Especially when a single control center is used to control all controllable home appliances and lamps at the same time, the method for determining the target to be controlled is an issue.

SUMMARY

The present disclosure provides a smart detection system that identifies an event position or predicts an event occurrence according to detection results of multiple sensors to perform the control on home appliances and/or lamps.

The present disclosure further provides a smart detection system that builds up an operation area using a robot and confirms a position of every sensor in the operation area via communication between the robot and multiple sensors.

The present disclosure provides a smart audio system including multiple audio devices, an acoustic host, multiple microphones and a central server. The multiple audio devices are arranged at different positions in a room. The acoustic host is coupled to the multiple audio devices, and configured to sequentially control each of the multiple audio devices to generate predetermined sound. The multiple microphones are arranged in the room to receive the predetermined sound generated by the multiple audio devices to respectively generate audio data. The central server is coupled to the multiple microphones to determine a speaker type and a position of each of the multiple audio devices according to the audio data associated with the predetermined sound and generated by the multiple microphones.

The present disclosure further provides a smart audio system including multiple audio devices, an acoustic host, multiple microphones and a central server. The multiple audio devices are arranged at different positions in a room, and each is configured to generate predetermined sound. The acoustic host is coupled to the multiple audio devices, and configured to confirm whether all the audio devices are arranged at a predetermined spatial relationship with one another. The multiple microphones are arranged in the room to receive the predetermined sound generated by the multiple audio devices to respectively generate audio data. The central server is coupled to the multiple microphones to determine a speaker type and a position of each of the multiple audio devices according to the audio data received from the multiple microphones.

In the embodiment of the present disclosure, a non-image sensor is referred to a sensor that does not output two-dimensional image frame but outputs an event signal for indicating an event occurrence. For example, a transceiver of the sensor outputs a digital value, e.g., 11 or 00, to indicate the occurrence of an event, but the present disclosure is not limited thereto.

In the embodiment of the present disclosure, a sensor model includes sensor information such as a type, a batch number and a maker. The central server confirms a protocol with a sensor based on the sensor model thereof. For example, the protocol includes a flickering mode of an indicator of the sensor, and the protocol is previously stored in a memory of the central server or downloaded from the network or cloud.

In the embodiment of the present disclosure, a position of a sensor is, for example, a space such as a living room, a bed room, a hallway, a bathroom or a kitchen. The sensor position is also referred to a detection range of a sensor.

BRIEF DESCRIPTION OF THE DRAWINGS

Other objects, advantages, and novel features of the present disclosure will become more apparent from the following detailed description when taken in conjunction with the accompanying drawings.

FIG. 5A is a schematic diagram of identifying an event position by a smart detection system according to one embodiment of the present disclosure.

DETAILED DESCRIPTION OF THE EMBODIMENT

It should be noted that, wherever possible, the same reference numbers will be used throughout the drawings to refer to the same or like parts.

The smart detection system in the present disclosure includes at least one sensor to detect an environment change or a user command, and includes a host to receive a detected result from the sensor and to provide related service. The smart detection system is applicable to the automatic detection and control in a smart home to realize the purposes of accurately identifying an event position and predicting the requirement of a family member. In some aspects, the detected result of the smart detection system is sent to a second location for being monitored via a local network and/or a wireless network.

Figure 1:
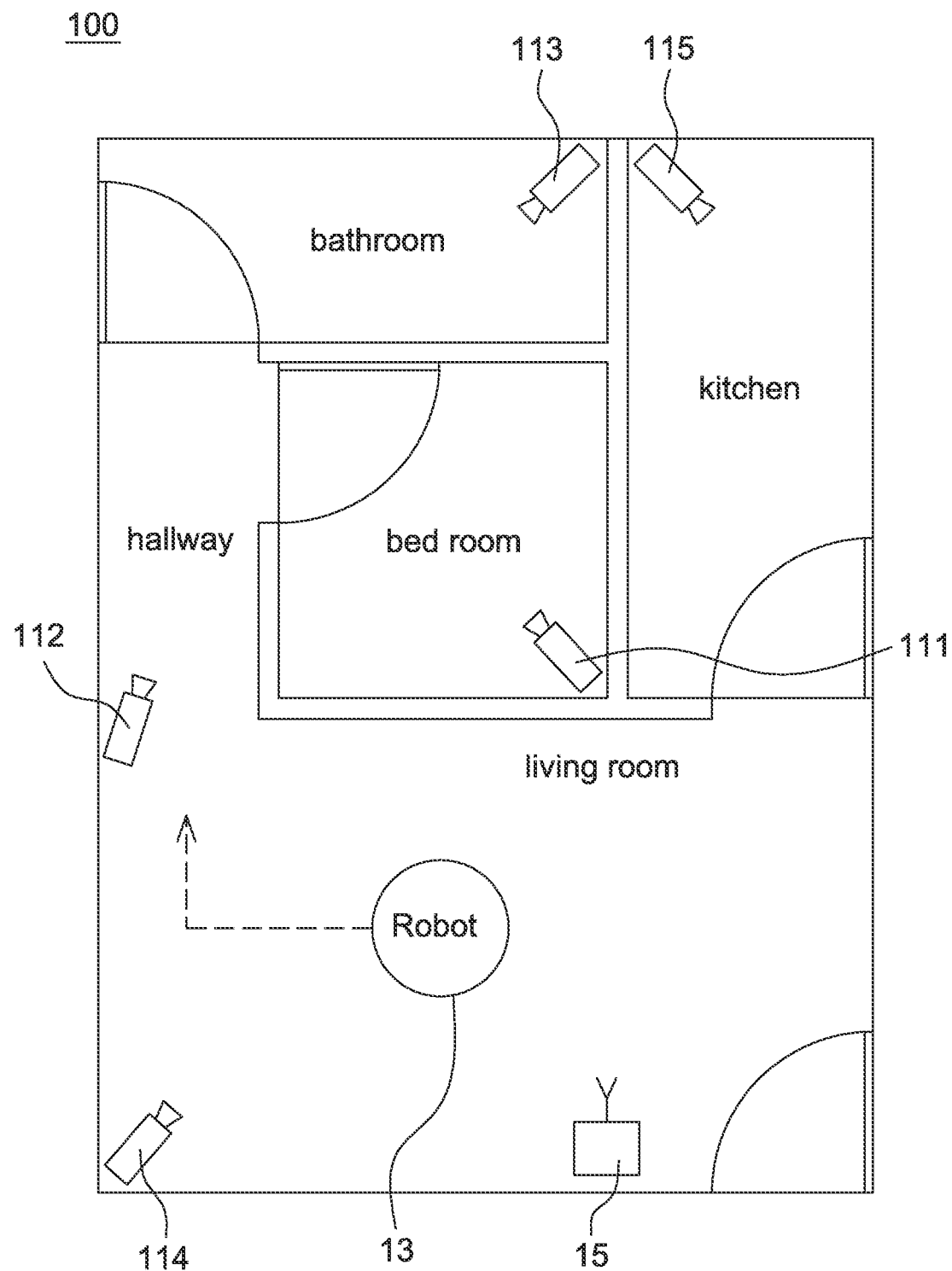
FIG. 1 is a schematic diagram of a smart detection system according to one embodiment of the present disclosure.

Please referring to FIG. 1, it is a schematic diagram of a smart detection system 100 according to one embodiment of the present disclosure. The smart detection system 100 includes multiple sensors 111 to 115 respectively arranged within an operation area in different spaces or at different positions such as a living room, a bedroom, a hallway, a bathroom, a kitchen, a balcony and a garage, but not limited to. Each of the sensors 111 to 115 is selected from a thermal sensor, an audio sensor, a light sensor, a motion sensor, a force sensor, an acceleration sensor (or G-sensor) and a physiological sensor, but not limited to. Each of the sensors 111 to 115 is used to provide a detected signal corresponding to a type thereof, e.g., a temperature signal, a sound signal, a light signal, a motion signal of an object, a pressure signal, an acceleration signal of an object or a biomedical signal. A part of the sensors 111 to 115 have an identical sensor type, or all of the sensors 111 to 115 have different sensor types.

It should be mentioned that, according to different applications, a part of the multiple sensors are arranged in a same space. For example, sensors of different types are arranged in the same space to detect different events, and the different sensors in the same space have identical or different detection ranges. For example, sensors of an identical type are arranged in the same space but have different detection ranges, detection angles or detection directions.

The smart detection system 100 also includes a robot 13 implemented as a host of the smart detection system 100 to recognize and communicate with the sensors 111 to 115, which are preferably not physically connected with the robot 13. In the embodiment, the robot 13 is capable of moving around the operation area. In another embodiment, the host may be implemented as a non-moving device and is used to receive information from a moving robot to recognize and communicate with the sensors 111 to 115. For example, in a case that the robot 13 is a host, the robot 13 receives the detected signal from the sensors 111 to 115. In a case that the smart detection system 100 has another host instead of the robot 13, the robot 13 receives the detected signal from the sensors 111 to 115 and transfers the received detected signal to the host, e.g., the robot 13 is a cleaning robot, a smoke detector, a smart lamp or a flight vehicle.

In the embodiment, the smart detection system 100 further includes an internet connecter 15 to transmit the detected signal from the sensors 111 to 115 or a control signal from the robot 13 to an internet server or an external cloud. In another embodiment, the internet connecter 15 is embedded in the host.

Figure 2:
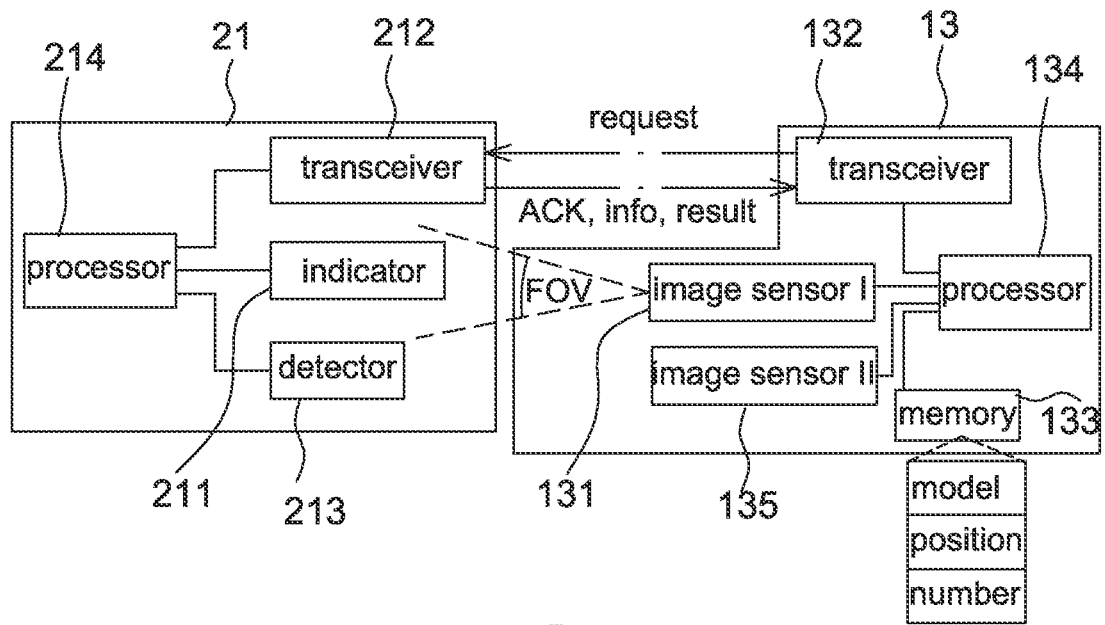
FIG. 2 is a block diagram of a smart detection system according to one embodiment of the present disclosure.

Referring to FIG. 2, it is a block diagram of a smart detection system 100 according to one embodiment of the present disclosure, including a sensor 21 and a robot 13. The sensor 21 is used to indicate any one of the multiple sensors 111 to 115 in FIG. 1. The sensor 21 includes at least an indicator 211, a transceiver 212, a detector 213 and a processor 214.

In some embodiments, the indicator 211 is an optical light source, a directional speaker or other signal emitters which could emit indicating signal within a limited angle or range. In the present disclosure, a light source is taken as an example for illustrating the indicator 211. The light source is preferably an invisible light source, e.g., an infrared light emitting diode or an infrared laser diode, and flickers at a predetermined pattern when being turned on.

Figure 3:
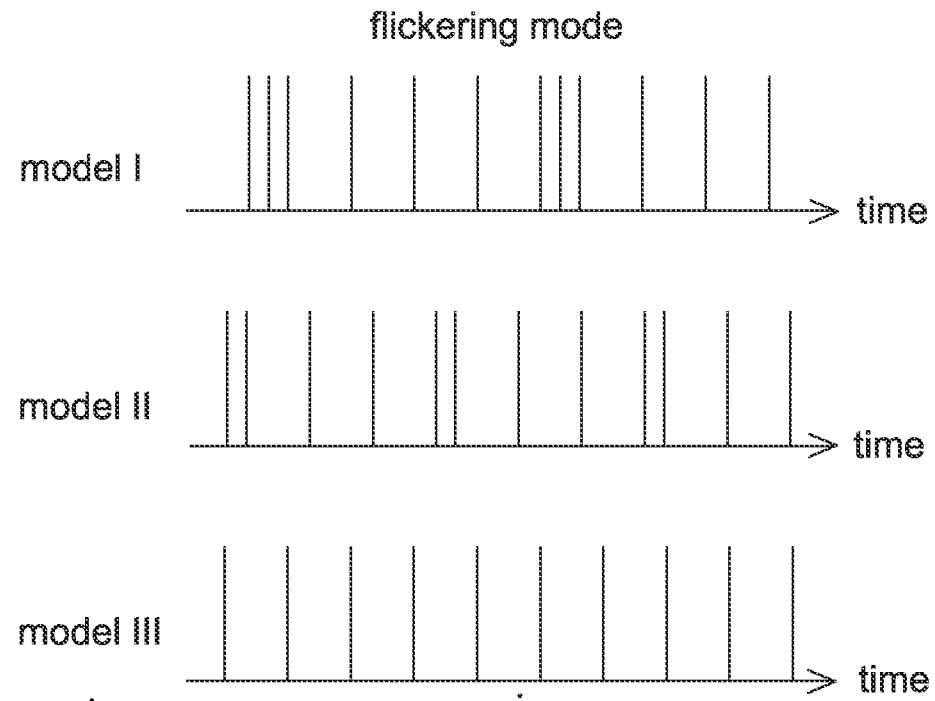
FIG. 3 is a schematic diagram of flickering modes of indicators in a smart detection system according to one embodiment of the present disclosure.

For example referring to FIG. 3, it is a schematic diagram of flickering modes of indicators 211 in a smart detection system 100 according to one embodiment of the present disclosure, wherein each vertical line indicates lighting up the light source. For example in FIG. 3, a first light source of sensor model I flickers in a first mode, a second light source of sensor model II flickers in a second mode, a third light source of sensor model III flickers in a third mode. The light source of one sensor model has one emission pattern indicated by a flickering mode and is different from the emission pattern of other sensor models. The flickering mode of the light source indicates a model of the sensor 21 including one or more information of a sensor type, a batch number, a maker, the emission pattern and so on, referred as sensor information herein. It should be mentioned that the emission pattern of the present disclosure is formed by a single light source or by multiple light sources, and the emission pattern includes one or more features of an emission frequency, an intensity variation, a phase variation, a layout of multiple light sources.

The flickering mode of the light source of every sensor 21 has a protocol with a central server (e.g., the host/robot) for the central server distinguishing different sensors 21 as described below, and the flickering mode is referred as identification information herein.

The transceiver 212 is, for example, a RF transceiver, a Bluetooth transceiver, a Zigbee transceiver or the like. The transceiver 212 sends wireless data containing sensor information of the corresponding sensor 111 to 115.

The detector 213 is used to detect an environment change and generate a detected signal respectively. The environment change is determined according to a sensor type, such as detecting the change of temperature, sound and light, the motion of an object, the pressure, the acceleration of an object, the physiological characteristics of a living body and so on. The detected signal of the detector 213 is sent to the processor 214 for post-processing.

The processor 214 is a digital signal processor (DSP), microcontroller (MCU), graphical processing unit (GPU), an application specific integrated circuit (ASIC) or a central processing unit (CPU). The processor 214 is electrically connected to the indicator 211, the transceiver 212 and the detector 213. The processor 214 is used to control the indicator 211 to emit light with a predetermined pattern, and controls the transceiver 212 to further send a detected signal to the robot 13. The detected signal may indicate an event occurrence, for example, a detected temperature being larger than a temperature threshold, a detected sound being larger than a sound threshold, a detected light intensity being larger than an intensity threshold, a detected object motion being larger than a variation threshold, a detected force being larger than a force threshold or a detected acceleration being larger than an acceleration threshold, a detected physiological characteristic exceeding a predetermined threshold, wherein every threshold is stored in the corresponding sensor 21.

In one non-limiting embodiment, the detected signal directly contains the detected value generated by the detector 213. In another non-limiting embodiment, the processor 214 processes the detected value at first to identify whether the detected value indicates an event occurrence, and generate a detected signal (e.g., at least one data bit) to indicate the event occurrence.

The robot 13 includes an image sensor 131, a transceiver 132, a memory 133 and a processor 134. In some embodiments, the robot 13 further includes an auxiliary image sensor 135 as a monitoring device. For example, the image sensor 131 senses invisible light; and the auxiliary image sensor 135 senses visible light such as a color image sensor. The robot 13 moves in an operation area constructed thereby including a living room, a bedroom, a hallway, a bathroom, a kitchen, a balcony and a garage to perform the sensor scanning and environment monitoring. The robot 13 constructs a map of the operation area by recording moving paths thereof, by acquiring and recording 2D or 3D images of every space using an image sensor (e.g., 131 or another image sensor), by using sound wave (in this case the robot 13 further including a sound detector) or radio wave (in this case the robot 13 further including an echo detector), or by using other conventional way to construct a working map without particular limitations.

It is appreciated that when the indicator 211 is a directional speaker, the image sensor 131 is replaced by a directional microphone. When the indicator 211 is other signal emitters, the image sensor 131 is replaced by a corresponding signal receiver.

The image sensor 131 is, for example, a CCD image sensor, a CMOS image sensor or the like. In this embodiment, the image sensor 131 operates in two ways. One operation is to acquire multiple image frames of the emission pattern of the indicator 211 (e.g., referring to FIG. 3) of each sensor 21, e.g., the image acquiring preferably synchronizing with the light emission. In order to be able to synchronize with multiple emission patterns, the image acquiring frequency is larger than an emission frequency of each emission pattern. The image sensor 131 itself has a digital signal processor to directly identify whether the flickering mode (e.g., identification information) matches a predetermined emission pattern (e.g., known from the protocol), and an identified result (e.g., Yes or No indicated by at least one bit data) is sent to the processor 134.

Another operation of the image sensor 131 is to send acquired image frames to the processor 134 for the post-processing. The post-processing is to, for example, identify whether a sensor message associated with the flickering mode matches (e.g., having identical coding) the sensor information contained in the wireless data sent by the transceiver 212 of the sensor 21 to perform the sensor confirmation. Or, the image frames are sent to the internet or external cloud via the internet connector 15.

The transceiver 132 is used to communicate with the transceiver 212 of every sensor 21 via a predetermined protocol, i.e. the transceivers 212 and 132 have an identical type to communicate with each other. The transceiver 132 sends a request to the transceiver 212 of each sensor 21 and receives a wireless data, e.g., ACK and sensor information, from every transceiver 212, i.e., the robot 13 configured as a master and the sensor 21 configured as a slave.

In another embodiment, the robot 13 is configured as a slave and the sensor 21 configured as a master to perform the communication therebetween. In such embodiment, the transceiver 212 sends a request to the transceiver 132, wherein the request could include the sensor information of the sensor 21. So that the robot 13 compares the sensor information from the request with the identification information from the captured indicating signal of the indicator 211 to identify and register the sensor 21 embedded with the above transceiver 212.

The memory 133 includes a volatile memory and/or non-volatile memory that store an algorithm for identifying the event position, various thresholds and parameters. The algorithm is implemented by software and/or hardware codes.

Figure 4A:
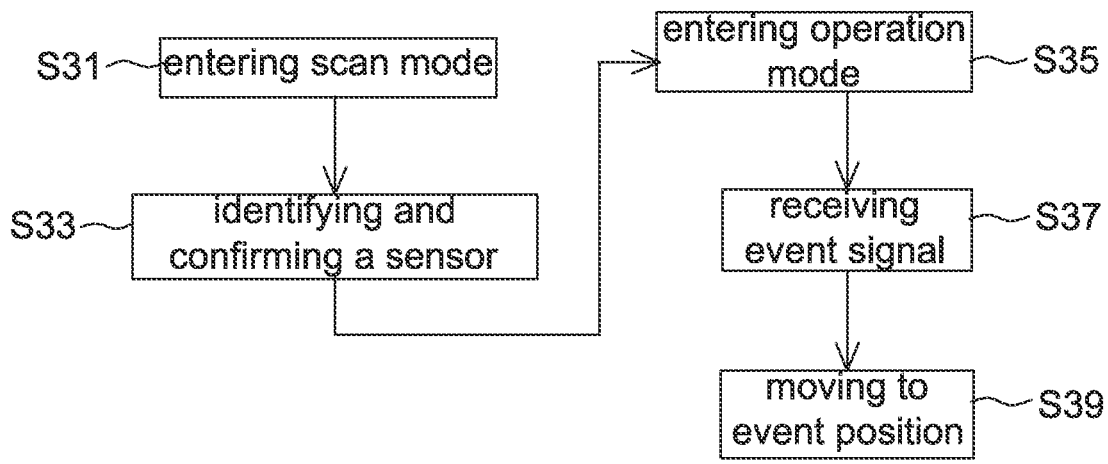
FIG. 4A is a flow chart of an operating method a smart detection system according to one embodiment of the present disclosure.

Please referring to FIG. 4A, it is a flow chart of an operating method of a smart detection system 100 according to one embodiment of the present disclosure, the method including: entering a scan mode (Step S31); identifying and confirming a sensor (Step S33); entering an operation mode (Step S35); receiving an event signal (Step S37); and moving to an event position (Step S39).

Referring to FIGS. 1 to 4A together, one example of the operating method is illustrated hereinafter.

Step S31: The smart detection system 100 enters a scan mode by the controlling of a user (via a physical button, a touch panel, a voice control or a remote control), or automatically enters every predetermined time interval, e.g., once a day. The smart detection system 100 also automatically enters the scan mode when receiving wireless data, via the transceiver 132, of an unknown sensor (not being recorded). In the scan mode, said wireless data contains the pairing request such as the ACK and sensor information. In the operation mode described below, said wireless data contains the detected signal and call signal.

Step S33: After entering the scan mode, the robot 13 starts to construct an operation area (if already constructed, then omitted), and an example of constructing a coverage map has been illustrated above and thus details thereof are not repeated again. Meanwhile, the robot 13 confirms every sensor position in a first scanning (no sensor been recorded). During other scanning after the first scanning, the robot 13 confirms only new sensor(s). In some non-limiting embodiments, the robot 13 further gives an assigned number to each confirmed sensor. The robot 13 confirms every sensor position during building up the operation area, or the operation area is built up at first and then the sensor position is confirmed sequentially, e.g., based on the scanned 2D or 3D images of background environment close to and/or behind the sensor to be confirmed.

After the operation area is constructed, for example, the robot 13 moves to a position close to or near a first sensor (e.g., sensor 114 in FIG. 1), and confirms a first position (e.g., living room in FIG. 1) in the operation area and, in some cases, assigns a first number, e.g., assigned number 1 (i.e. firstly been recorded), of the first sensor 114 according to the first mode of the light source 211 of the first sensor 114 and the first wireless data from the wireless transceiver 212 of the first sensor 114. The memory 133 is stored with data of the first sensor 114 including a model, position, emission pattern and given number of the first sensor 114.

The robot 13 detects the existence of a sensor by an indicating signal thereof. For example, when the image sensor 131 detects a first indicating signal containing the first identification information, the transceiver 132 records the first emission pattern and sends a request. Then, the transceivers 212 of multiple sensors all receive this request and respectively send wireless data of the associated sensor. The robot 13 needs to distinguish different wireless data from different sensors.

In one embodiment, the request contains information associated with the first mode. The processor 214 of every sensor 21 recognizes this information at first, and only the sensor 21 matches this information sends ACK via the transceiver 212 thereof and continuous to flicker in the first mode. The sensors not matching this information stops flickering for a predetermined time interval. When the processor 134 of the robot 13 identifies that the continuously detected first indicating signal matches the first sensor information in the first wireless data (e.g., the ACK), a first model, a first position, an emission pattern and a first number of the first sensor 114 are registered and recorded in the memory 133.

In another embodiment, the processor 134 of the robot 13 identifies a time sequence of receiving the ACK from different sensors. It is assumed that the wireless data of the sensor 21 within a current field of view of the image sensor 131 of the robot 13 is received at first, and the information that is received at first is considered as first sensor information.

In an alternative embodiment, the robot 13 sends another request to cause the light source of different sensors 21 to flicker at a different predetermined mode, and the processor 134 identifies which of the multiple sensors flickers in a way matching the corresponding predetermined mode according to image frames captured by the image sensor 131. It is possible that the robot 13 recognizes different sensors in other ways based on both the flickering mode and wireless data of the sensors. For example, if the indicator 211 is not a light source, the flickering mode refers to intensity fluctuating of the indicating signal.

In an alternative embodiment, if the whole smart detection system 100 including the robot 13 and multiple sensors is provided by the same provider, each sensor has unique identification information which is recognizable by the robot 13. That is, as long as detecting one identification information contained in the indicating signal, the robot 13 knows which sensor has been detected. In this case, the robot 13 only needs to records the position of every sensor in the scan mode without further confirmation with each sensor by communicating wireless data.

Next, when the processor 134 identifies that there is other wireless data not being associated with the recorded sensor data, the robot 13 continuously moves to a position close to or near a second sensor (e.g., sensor 112 in FIG. 1) and detects the existence of a second sensor by a second indicating signal. Similarly, when a current field of view of the image sensor 131 appears the second mode (i.e. second identification information contained in the second indicating signal), the robot 13 communicates with the second sensor 112 using the above mentioned method to cause the second transceiver 212 to send second wireless data containing second sensor information. The robot 13 also determines a second position (e.g., hallway in FIG. 1) in the operation area and a second number, in some cases, of the second sensor 112 according to the second indicating signal and the second wireless data. The second model, second position and second number of the second sensor 112 are recorded in the memory 133.

The second sensor 112 and the first sensor 114 have identical or different sensor types. When the robot 13 confirms that all sensors in the operation area are scanned, e.g., in the operation area no flickering mode not being detected or no received wireless data not being matched, the scan mode is ended and the robot 13 returns to a charge station. A position of the charge station is arranged at any proper position in the operation area without particular limitations.

Step S35: When the scan mode is ended, an operation mode is entered automatically. Or, when the scan mode is ended and the robot 13 returns to the charge station, an operation mode is entered automatically. Or, the operation mode is entered by the selection of a user. When the scan mode is ended, a working map (e.g., operation area) and positions of every sensor in the working map are stored in the memory 133.

Step S37: In the operation mode, when one of the multiple recorded sensors detects an event, said sensor calls the robot 13 by sensing a call signal or an event signal, wherein the method of detecting an event has been illustrated above. For example, when the first sensor 114 detects an event, a first transceiver 212 thereof sends a first event signal to call the robot 13. In the operation mode, when the robot 13 receives wireless data which is not been matched, the scan mode is automatically entered again to repeat the operation in Step S33.

Step S39: After receiving the first event signal, the robot 13 leaves the charge station and moves to a first position of the first sensor 114. Because the first position has been recorded in the memory 133, the robot 13 directly moves toward the first position. When the first position is reached, the robot 13 turns on the auxiliary image sensor 135 therein (microphone also being turned on if included) to monitor a current status at the first position. In one non-limiting embodiment, the robot 13 further checks the flickering mode of the first sensor 114 to make sure that the first position is reached correctly. In one non-limiting embodiment, the image frames captured by the auxiliary image sensor 135 of the robot 13 and sound received by the microphone are sent to a local network or uploaded to a cloud via the internet connector 15, or transmitted to a portable device via a wireless network.

When any sensor 21 in the operation area detects an event, the smart detection system 100 operates as the Step S39. The sensor 21 not detecting any event does not send a call signal or event signal. In one embodiment, the auxiliary image sensor 135 of the moveable roble 13 is only turned on in the operation mode when the moveable roble 13 reaches an event position.

Figure 4B:
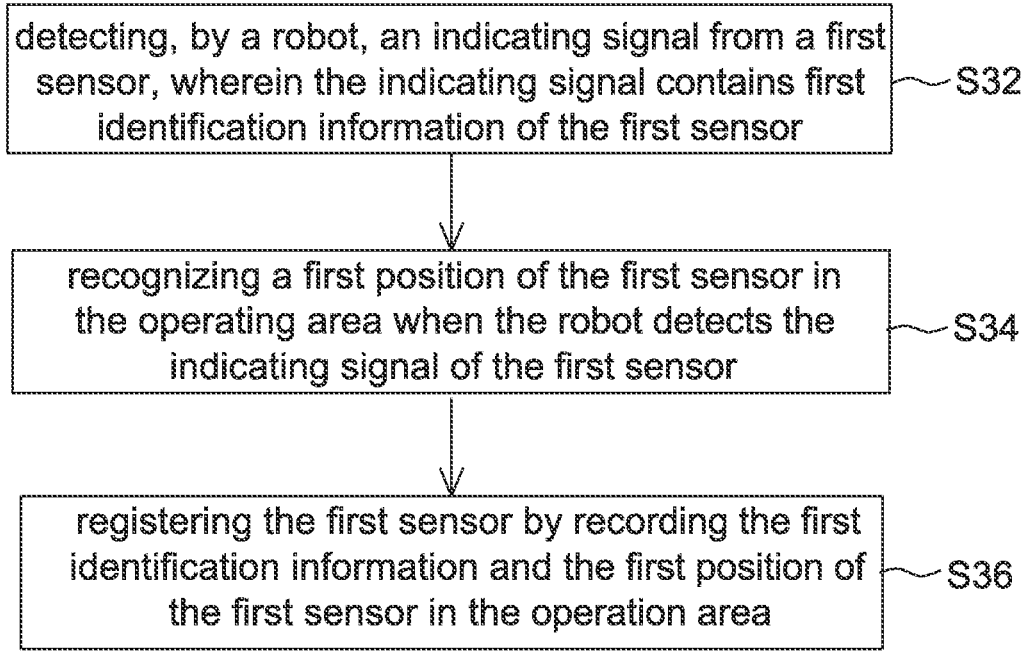
FIG. 4B is a flow chart of a sensor registering method applicable to a smart detection system according to one embodiment of the present disclosure.

Referring to FIG. 4B, it is a flow chart of a sensor registering method applied in a robot according to one embodiment of the present disclosure, the method including the steps of: detecting, by a robot, indicating signal from a first sensor, wherein the indicating signal contains first identification information of the first sensor (Step S32); recognizing a first position of the first sensor in the operation area when the robot detects the indicating signal of the first sensor (Step S34); and registering the first sensor by recording the first identification information and the first position of the first sensor in the operation area (Step S36). In this embodiment, the identification information of the first sensor includes, for example, the first mode mentioned above and FIG. 3.

As mentioned above, the robot 13 constructs an operation area in a scan mode. In the scan mode, in addition to determining a range of the operation area, the robot 13 further records 2D or 3D appearance or features of different locations and viewing angles within the operation area. Meanwhile, in the scan mode, when the robot 13 detects indicating signal generated by the indicator 211 from a first sensor (Step S32), the robot 13 recognizes a first position of the first sensor in the operation area by comparing a current image captured by the robot 13 and the stored 2D or 3D appearance or features of different locations within the operation area to determine the first position of the first sensor in the operation area (Step S34). And then, the robot 13 registers the first sensor by recording the first identification information and the first position of the first sensor in the operation area as well as, in some cases, by giving an assigned number to the first sensor (Step S36).

As mentioned above, the first sensor further sends first wireless data containing first sensor information to the robot 13 to allow the robot 13 to identify whether sensor message (e.g., the flickering mode) indicated by the first identification information matches the first sensor information for sensor confirmation. This is useful when a field of view of the robot 13 contains multiple sensors at the same time.

If the operation area includes a second sensor, the sensor registering method further includes the steps of: detecting, by the robot, indicating signal from a second sensor, wherein the indicating signal contains second identification information of the second sensor; sending second wireless data containing second sensor information from the second sensor to the robot; recognizing a second position of the second sensor in the operation area when the robot detects the indicating signal of the second sensor; and registering the second sensor by recording the second identification information and the second position of the second sensor in the operation area. These steps are similar to those associated with the first sensor only the target sensor being changed.

As mentioned above, the first sensor and the second sensor will send an event signal to call the robot 13 to move to an event location. When receiving event signals from multiple sensors, the robot 13 identifies an event position according to signal strengths of or a time sequence of receiving the multiple event signals.

When a central server, e.g., the robot 13, receives event signals from sensors at different positions, e.g., the above first sensor 114 and the second sensor 112, the robot 13 identifies an event position according to signal strengths or amplitudes of the first event signal and the second event signal. Referring to FIG. 5A, if both the first sensor 114 and the second sensor 112 are audio sensors, a sensor closer to an event occurring location can receive a larger sound, e.g., a sound of object or people falling, and the robot 13 identifies an event position according to the strength or amplitudes of the sound. In this case, the event position may not be located at a first position of the first sensor 114 or a second position of the second sensor 112 but between the first position and the second position. In addition, the temperature sensor (e.g., far infrared sensor) generates temperature signals of different strengths due to a distance from a higher temperature object, e.g., a human body.

In addition, when receiving event signals from sensors at different positions, e.g., the above first sensor 114 and the second sensor 112, the robot 13 determines an event position according to a time sequence of receiving a first event signal and a second event signal. An audio sensor is also taken as an example for illustration herein. Referring to FIG. 5A, an event occurs at, for example, time $t_0$, and a sensor I closer to an event position sends an event signal at an earlier time (e.g., at time $t_1$), a sensor II sends an event signal at a time (e.g., at time $t_2$), and a sensor III farther from the event position sends an event signal at a later time (e.g., at time $t_3$). The robot 13 identifies the event position according to the time difference. Similarly, although FIG. 5A shows that the event position is at the position of sensor I, it is possible that the event position is between the position of sensor I and the position of sensor III but closer to the position of sensor I.

In some cases, a wireless signal is sent from a radio transmitter of an electronic device located at a position having different distances from different radio receivers (i.e. one kind of sensor herein). The central server locates the position of the electronic device according to signal strengths or a receiving sequence of the radio signal received by different radio receivers. That is, the event in this case is referred to an electronic device sending a wireless signal, e.g., the wireless signal being sent when it is turned on, ends a sleep mode or controlled to send the wireless signal.

In one non-limiting embodiment, to maintain privacy in the home, the above first sensor 114 and second sensor 112 are not image sensors. An image sensor 135 is only arranged in the robot 13 herein. In other words, the image sensor 135 is used only if an abnormal event occurs to watch the status.

In a word, the smart detection system 100 of the embodiment of the present disclosure includes multiple sensors and a central server, e.g., the host mentioned above. The central server is a computer device such as a desktop computer, a notebook computer, a tablet computer or smartphone. Or, the central server is a robot as mentioned above.

A smart detection system 100 having two sensors is also taken as an example for illustration herein. The central server is used to previously record a first position and a second position of a first sensor and a second sensor respectively in an operation area. The first and second positions are set by a user manually or confirmed using the above mentioned scan mode. When the central server is not a robot, a user holds the central server to scan (using similar method mentioned above), or the user holds a remote controller wirelessly coupled to the central server to perform the scanning. The position, model and given number of every sensor is confirmed and stored in the scan mode. The scan mode is ended when the user presses a predetermined button to automatically enter an operation mode. The first sensor is used to send a first event signal when detecting an event, and the second sensor is used to send a second event signal when detecting the same event.

In the operation mode, the central server identifies an event position in the operation area according to signal strengths of the first and second event signals and/or a time sequence of receiving the first and second event signals.

Figure 5B:
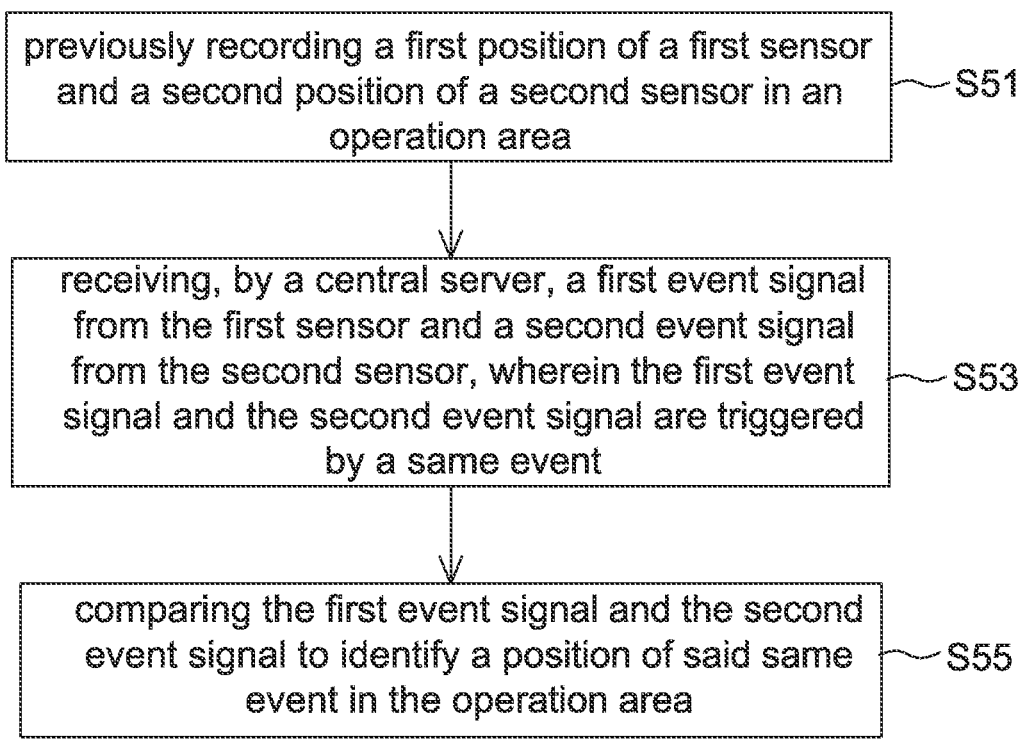
FIG. 5B is a flow chart of an event identifying method of a smart detection system according to one embodiment of the present disclosure.

Referring to FIG. 5B, the present disclosure further provides an event identifying method applicable to the smart detection system according to the embodiment of the present disclosure, including the steps of: previously recording a first position of a first sensor and a second position of a second sensor in an operation area (Step S51); receiving, by a central server, a first event signal from the first sensor and a second event signal from the second sensor, wherein the first event signal and the second event signal are triggered by a same event (Step S53); and comparing the first event signal and the second event signal to identify a position of said same event in the operation area (Step S55).

As mentioned above, the first position and the second position are recorded in a scan mode based on an image frame captured by the robot and/or wireless data communicating between the robot and sensors.

As mentioned above, the first sensor and the second sensor are audio sensors, thermal sensors or radio receivers according to different applications.

As mentioned above, the central server is arranged to identify the position of said same event in the operation area by comparing signal strengths and/or a time sequence of receiving the first event signal and the second event signal.

In one non-limiting embodiment, the smart detection system 100 also includes a first image sensor (e.g., color sensor) arranged at the first position of the first sensor and a second image sensor (e.g., color sensor) arranged at the second position of the second sensor, i.e. an image sensor and a non-image sensor, e.g., a thermal sensor, an audio sensor, a light sensor, a motion sensor, a physiological sensor or an acceleration sensor, being arranged at a same position. As mentioned above, to protect the privacy, the first image sensor and the second image sensor are turned off before the event position is identified. The image sensor associated with an event position is turned on only when the central server identifies the event position of an event occurring in the operation area, and the image sensor at other position(s) is not turned on. That is, the event identifying method of the present disclosure further includes a step: turning on an image sensor arranged at the position of said same event after the central server identifies the position of said same event in the operation area.

If the central server is a robot 13 and when an event position of an event (e.g., same event detected by different sensors at different positions) in the operation area is identified, the robot 13 then moves to the event position and turns on the image sensor 131 thereof.

Figure 6A:
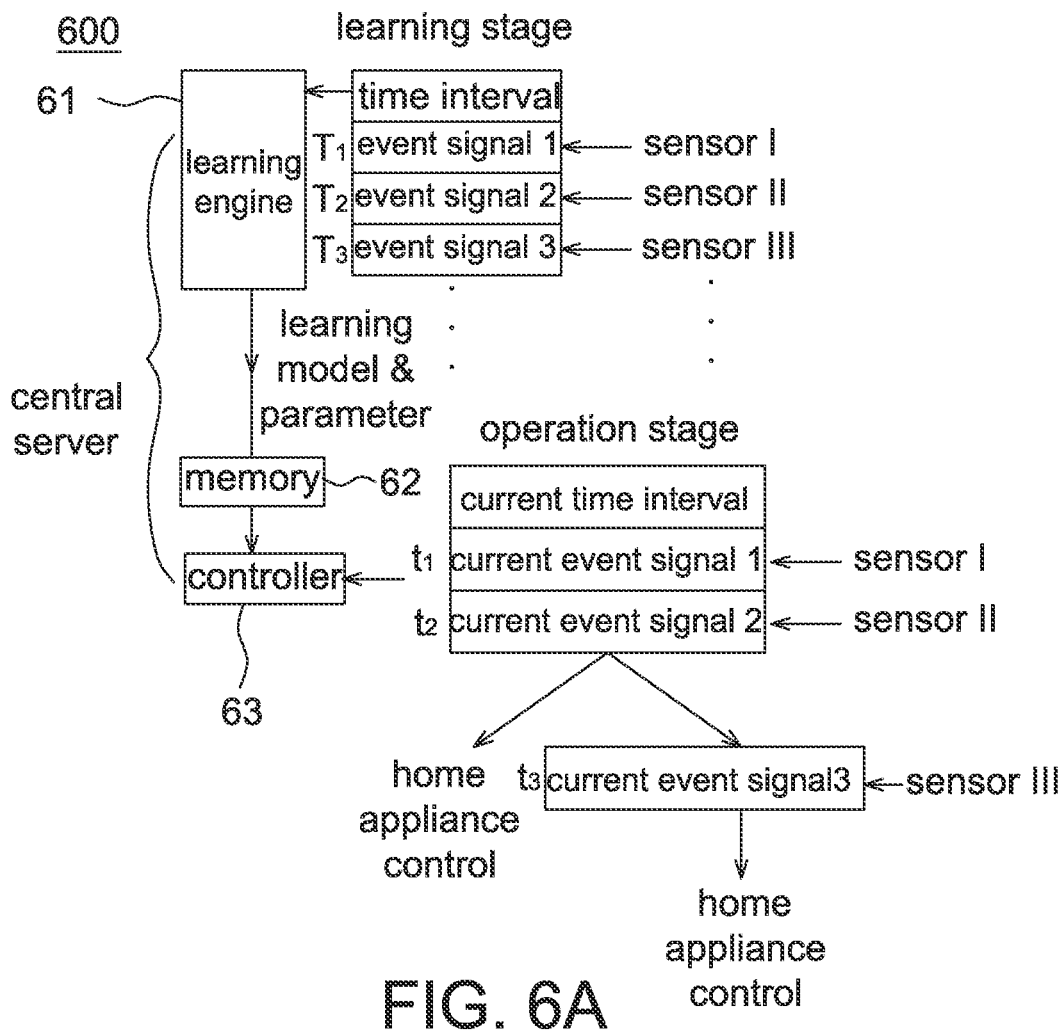
FIG. 6A is an operational schematic diagram of a smart detection system according to another embodiment of the present disclosure.

Referring to FIG. 6A, it is an operational schematic diagram of a smart detection system 600 according to another embodiment of the present disclosure. The smart detection system 600 also includes multiple sensors arranged in different spaces or at different positions as shown in FIG. 1. Each of the multiple sensors is used to send an event signal when detecting an event (not limited to the same event), wherein the method of detecting the event has been illustrated above, and thus details thereof are not repeated herein. Each of the multiple sensors is selected from a thermal sensor, an audio sensor, a light sensor, a motion sensor, a force sensor, an acceleration sensor, an image sensor, a physiological sensor, a current sensor or a voltage sensor.

The smart detection system 600 further includes a central server that is wired or wirelessly coupled to each of the multiple sensors to receive a detected signal therefrom and home appliances to be controlled. The central server of this embodiment is also a computer device including desktop computer, a notebook computer, a tablet computer or a smartphone. The home appliances to be controlled include various lamps and electronic devices in which a current sensor or a voltage sensor is embedded. As long as a home appliance is turned on or turned off, the sensor therein sends an event signal (i.e. the event in this embodiment further including on/off of home appliances) to the central server. The home appliance to be controlled is referred to any lamp or electronic device controllable by the smart detection system 600.

The central server includes a learning engine 61, a memory 62 and a controller 63, and the operation of the central server is implemented by software and/or hardware.

The learning engine 61 uses, for example, data network structure such as a neural network learning algorithm or a deep learning algorithm to learn, in a learning stage, an operation pattern of a user according to a time interval and a time sequence of multiple event signals sent by the multiple sensors. In one embodiment, the event signal not within the time interval, e.g., based on a system clock of the smart detection system 600, is not selected as the machine learning material, but not limited thereto.

The learning of the learning engine 61 determines a learning model and the learning parameter to be recorded in the memory 62. The learning stage is entered or ended by a user.

For example referring to FIG. 6A, in the learning stage, the learning engine 61 receives an event signal 1 at time $T_1$, an event signal 2 at time $T_2$, an event signal 3 at time $T_3$ and so on within a time interval, wherein the event signals 1 to 3 are sent respectively by different sensors and the event signals 1-3 are triggered by different events. The time interval is one time period of one day. For example, during 6 to 7 o'clock in the morning, the learning engine 61 sequentially receives event signals of turning on bedroom light (e.g., the sensor 111 in FIG. 1 sending an event signal 1), turning on hallway light (e.g., the sensor 112 in FIG. 1 sending an event signal 2) and turning on a coffee machine (e.g., a sensor in the coffee machine or an image sensor 115 in FIG. 1 sending an event signal 3). The learning engine 61 stores the learning parameter and learning model generated by learning these successive events into the memory 62.

The memory 62 includes a volatile memory and/or non-volatile memory for storing the data network structure, learning parameter, learning model and other parameters required in the system operation. When the learning parameter and learning model are stored, the learning stage is ended.

In the operation stage, the controller 63 compares a current time interval and a current time sequence of multiple current event signals with the stored operation pattern to turn on/off the home appliances to be controlled. The controller 63 is, for example, a microcontroller or a central processing unit. When sequentially detecting, within a time interval between 6 and 7 o'clock every day morning (i.e. the current time interval), the bedroom light being turned on (e.g., the sensor 111 in FIG. 1 sending a current event signal 1) and the hallway light being turned on (e.g., the sensor 112 in FIG. 1 sending a current event signal 2), then the controller 63 automatically turns on or warms up the coffee machine such that the user can spend much fewer time on waiting for cooking coffee. In one non-limiting embodiment, if the user does not use the coffee machine or the sensor 115 does not detect the user entering the kitchen after the coffee machine is turned on or warmed up for a predetermined interval, the controller 63 further automatically turns off the coffee machine to save power and extend the service life thereof.

Figure 6B:
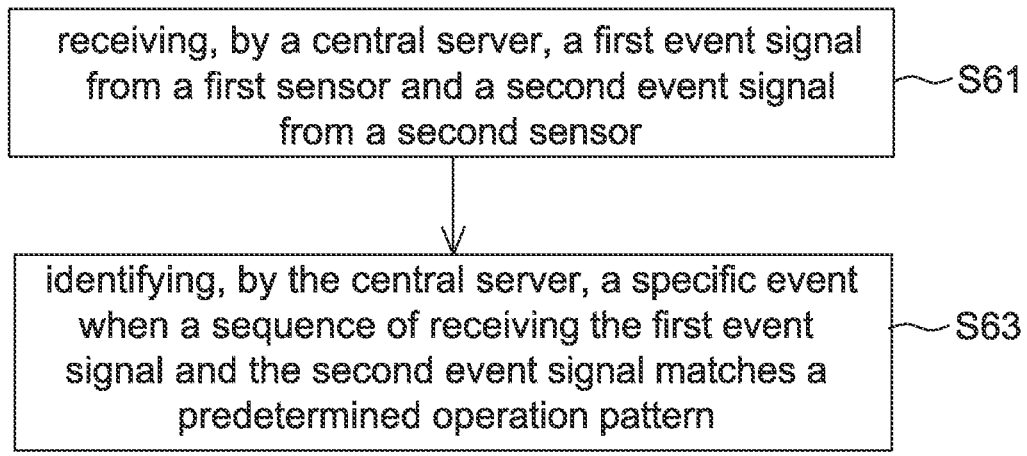
FIG. 6B is a flow chart of an event identifying method of a smart detection system according to another embodiment of the present disclosure.

Referring to FIG. 6B, the present disclosure further provides an event identifying method applicable to the smart detection system according to another embodiment of the present disclosure, the method including the steps of: receiving, by a central server, a first event signal from a first sensor and a second event signal from a second sensor (Step S61); and identifying, by the central server, a specific event when a sequence of receiving the first event signal and the second event signal matches a predetermined operation pattern (Step S63).

As mentioned above, the predetermined operation pattern is determined, in a learning stage, by using a learning engine 61 to learn an operation pattern of a user. And in an operation stage, a specific event is identified, preferably within a predetermined time interval of a day such as in the morning, in the evening or at night, when a current time sequence of receiving the first event signal and the second event signal matches the predetermined operation pattern.

In this aspect, after the specific event is identified, at least one home appliance to be controlled is automatically turned on or turned off by the central server. Using the central server to predict the future operation of a user based on the machine-learned operation pattern, it is able to realize smart home life. In some aspects, multiple home appliances are turned on/off simultaneously or sequentially (e.g., based on the operation learned in the learning stage) according to a sequence of multiple event signals received by the central server.

It is appreciated that a number of times of learning in the learning stage and a sequence of event signals are not limited to those given in the present disclosure but determined according to the actual user's behavior. The central server learns multiple operation patterns within multiple time intervals of one day (controlled by the user) to perform the smart control on home appliances.

It should be mentioned that examples in the above embodiment such as a number of sensors, flickering patterns, time differences, signal strengths are only intended to illustrate but not to limit the present disclosure. The payload of the packet of the wireless data contains at least the bit for indicating the event occurrence and the bit for indicating the sensor information so as to indicate the event being detected by a specific sensor.

Figure 7:
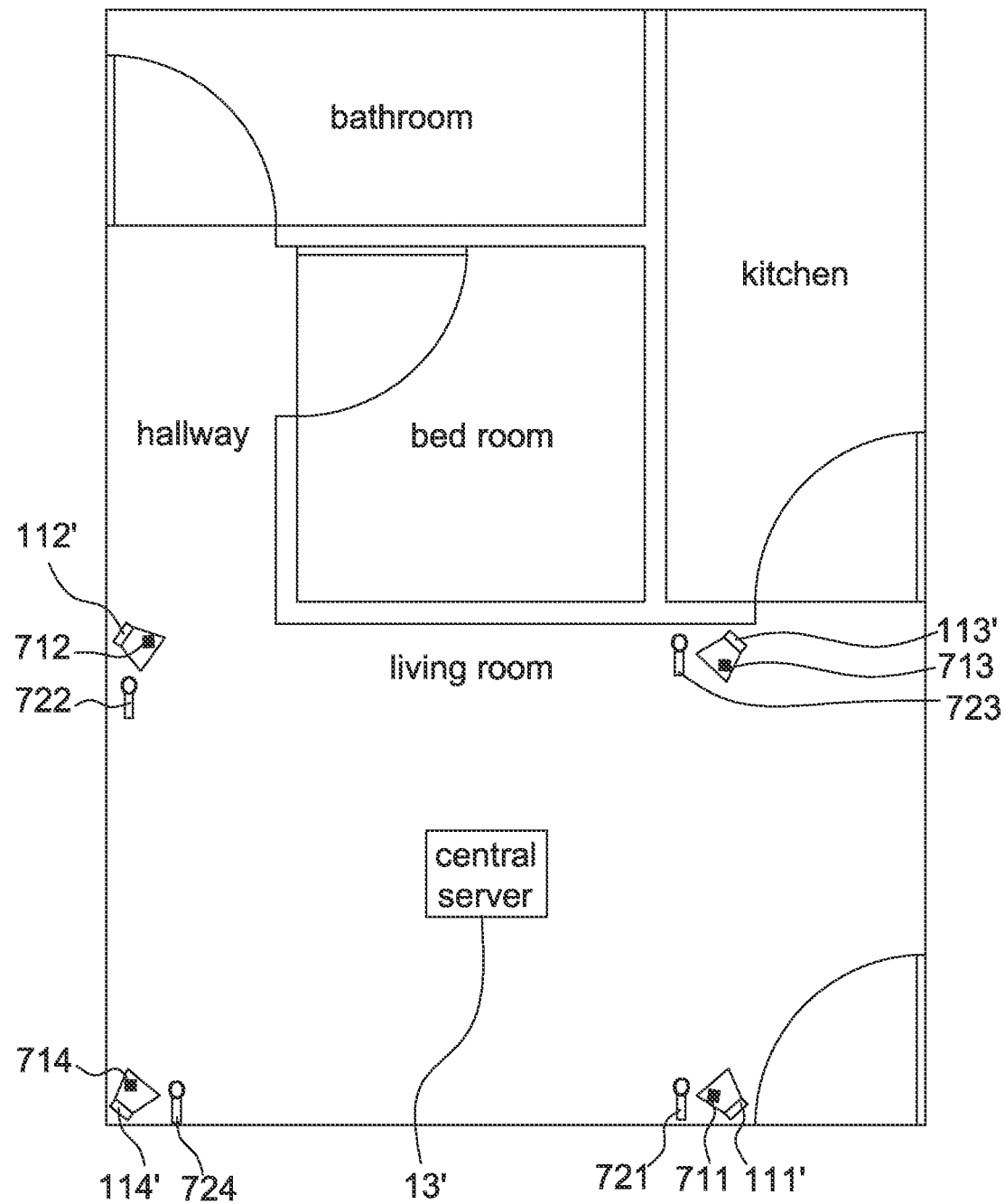
FIG. 7 is a schematic diagram of a smart audio system according to one embodiment of the present disclosure.

In one embodiment, the sensors 111-115 in FIG. 1 are replaced by speakers, e.g., included in audio devices 111'-114' (arranged at different positions from FIG. 1) shown in FIG. 7 to form a smart audio system 700. FIG. 7 is a schematic diagram of a smart audio system 700 according to one embodiment of the present disclosure. It is appreciated that positions of the audio devices 111'-114' shown in FIG. 7 are only intended to illustrate but not to limit the present disclosure. Besides, the robot 13 shown in FIG. 1 is replaced by a central server 13', which is the robot or host as mentioned above. More specifically, in this embodiment, the operation of the central server 13' is not changed from the above robot/host only the identified target is changed from the above sensors 111-115 to audio devices 111'-114'. It is appreciated that since the target is changed to speakers, the transmitted wireless data is also changed to be associated with parameters of a speaker. Below are brief descriptions of the scan mode and operation mode of the smart audio system 700.

Figure 8:
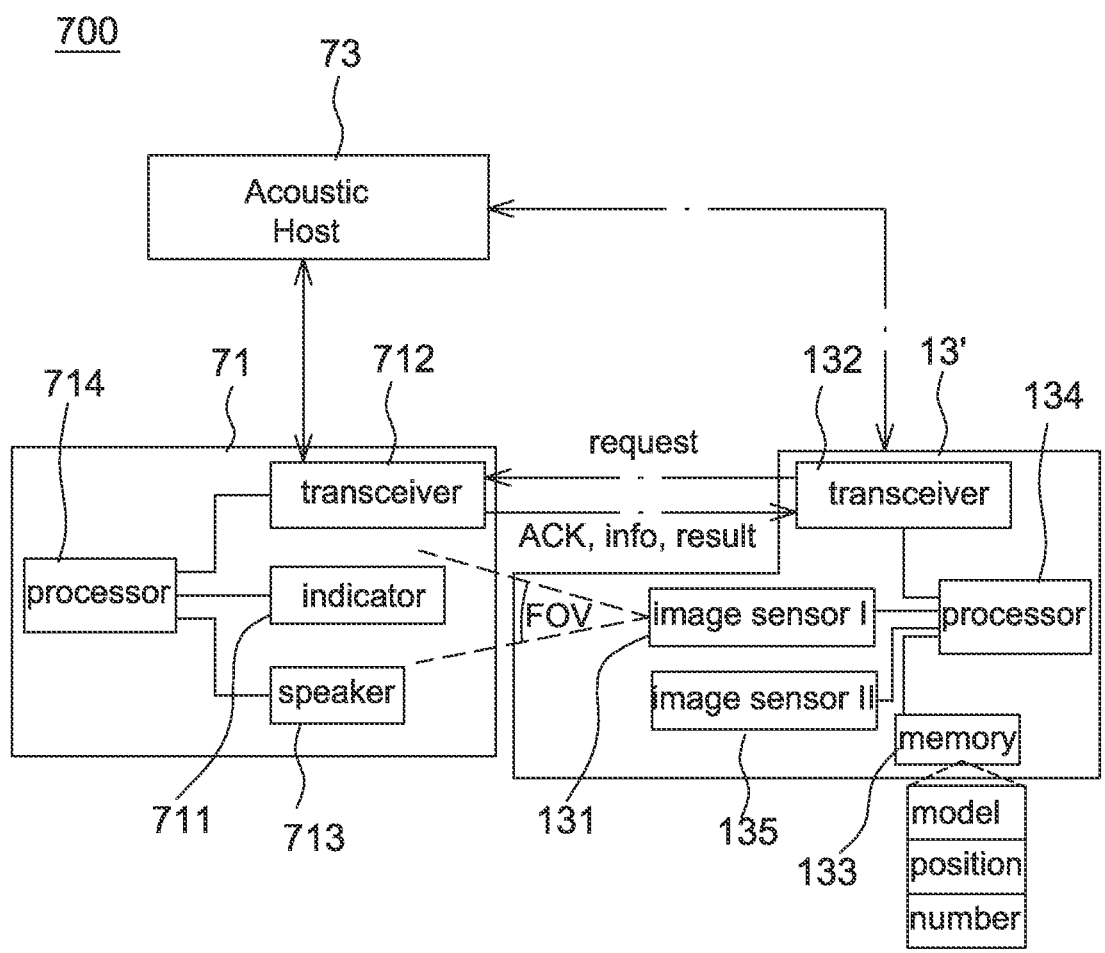
FIG. 8 is a block diagram of a smart audio system according to one embodiment of the present disclosure.

For example, FIG. 8 is a block diagram of a smart audio system 700 according to one embodiment of the present disclosure, including an audio device 71 and a central server 13'. The audio device 71 is used to indicate any one of the audio devices 111'-114' in FIG. 7. The audio device 71 includes an indicator 711, a transceiver 712, a speaker 713 and a processor 714. The operations of the indicator 711, the transceiver 712 and the processor 714 are similar to those pf the indicator 211, the transceiver 212 and the processor 214 only the processed data content is changed to be associated with the parameter(s) of speaker 713.

Similar to FIG. 4A, an operating method of the smart audio system 700 according to one embodiment of the present disclosure includes: entering a scan mode; and identifying and confirming an audio device.

The smart audio system 700 enters the scan mode by the controlling of a user (via a physical button, a touch panel, a voice control or a remote control), or automatically enters the scan mode every predetermined time interval, e.g., once a day, or enters the scan mode every time the smart audio system 700 being powered on. The smart audio system 700 also automatically enters the scan mode when receiving wireless data, via the transceiver 132, of an unknown audio device (not being recorded). In the scan mode, said wireless data contains the pairing request such as the ACK and audio device information.

After entering the scan mode, the central server 13' (taking a robot as an example for illustration purposes) starts to construct an operation area (if already constructed, then omitted) as illustrated above. Meanwhile, the central server 13' confirms every audio device position in a first scanning (no audio device been recorded). During other scanning after the first scanning, the central server 13' confirms only new audio device(s). In some non-limiting embodiments, the central server 13' further gives an assigned number to each confirmed audio device. The central server 13' confirms every audio device position during building up the operation area, or the operation area is built up at first and then the audio device position is confirmed sequentially, e.g., based on the scanned 2D or 3D images of background environment close to and/or behind the audio device to be confirmed.

After the operation area is constructed, for example, the central server 13' moves to a position close to or near a first audio device (e.g., audio device 114' in FIG. 7), and confirms a first position (e.g., lower left corner in FIG. 7) in the operation area and, in some cases, assigns a first number, e.g., assigned number 1 (i.e. firstly been recorded), of the first audio device 114' according to the first mode of the indicator 711 (e.g., referring to FIG. 3) of the first audio device 114' and the first wireless data from the wireless transceiver 712 of the first audio device 114'. The memory 133 is stored with data of the first audio device 114' including a model (e.g., speaker type including input resistor, output power, frequency parameter or the like), position, emission pattern and given number of the first audio device 114'.

The central server 13' detects the existence of an audio device by an indicating signal thereof. For example, when the image sensor 131 detects a first indicating signal containing the first identification information, the transceiver 132 records the first emission pattern and sends a request. Then, the transceivers 712 of multiple audio devices all receive this request and respectively send wireless data of the associated audio device. The central server 13' needs to distinguish different wireless data from different audio devices.

In one embodiment, the request contains information associated with the first mode. The processor 714 of every audio device 71 recognizes this information at first, and only the audio device 71 matches this information sends ACK via the transceiver 712 thereof and continuous to flicker in the first mode. The audio devices not matching this information stops flickering for a predetermined time interval. When the processor 134 of the central server 13' identifies that the continuously detected first indicating signal matches the first audio device information in the first wireless data (e.g., the ACK), a first model, a first position, an emission pattern and a first number of the first audio device 114' are registered and recorded in the memory 133.

In another embodiment, the processor 134 of the central server 13' identifies a time sequence of receiving the ACK from different audio devices. It is assumed that the wireless data of the audio device 71 within a current field of view of the image sensor 131 of the central server 13' is received at first, and the information that is received at first is considered as first audio device information.

In an alternative embodiment, the central server 13' sends another request to cause the light source of different audio devices 71 to flicker at a different predetermined mode, and the processor 134 identifies which of the multiple audio devices flickers in a way matching the corresponding predetermined mode according to image frames captured by the image sensor 131. It is possible that the central server 13' recognizes different audio devices in other ways based on both the flickering mode and wireless data of the audio devices. For example, if the indicator 711 is not a light source, the flickering mode refers to intensity fluctuating of the indicating signal.

In an alternative embodiment, if the whole smart audio system 700 including the central server 13' and multiple audio devices is provided by the same provider, each audio device has unique identification information which is recognizable by the central server 13'. That is, as long as detecting one identification information contained in the indicating signal, the central server 13' knows which audio device has been detected. In this case, the central server 13' only needs to records the position of every audio device in the scan mode without further confirmation with each audio device by communicating wireless data.

Next, when the processor 134 identifies that there is other wireless data not being associated with the recorded audio device data, the central server 13' continuously moves to a position close to or near a second audio device (e.g., audio device 112' in FIG. 7) and detects the existence of a second audio device by a second indicating signal. Similarly, when a current field of view of the image sensor 131 appears the second mode (i.e. second identification information contained in the second indicating signal), the central server 13' communicates with the second audio device 112' using the above mentioned method to cause the second transceiver 712 to send second wireless data containing second audio device information. The central server 13' also determines a second position (e.g., upper left corner in FIG. 7) in the operation area and a second number, in some cases, of the second audio device 112' according to the second indicating signal and the second wireless data. The second model, second position and second number of the second audio device 112' are recorded in the memory 133.

The second audio device 112' and the first audio device 114' have identical or different speaker types. When the central server 13' confirms that all audio devices in the operation area are scanned, e.g., in the operation area no flickering mode not being detected or no received wireless data not being matched, the scan mode is ended and the central server 13' returns to a charge station. A position of the charge station is arranged at any proper position in the operation area without particular limitations.

In the case that the central server 13' is a non-moving device (e.g., attaching on the ceiling, but not limited to), the FOV of the central server 13' covers all audio devices, e.g., 111'-114' need to be registered and recorded, and the central server 13' registers and records every audio devices using the above method only the central server 13' not moving from one position to another.

Similarly, the first audio device 114' further sends first wireless data containing first audio device information to the central server 13' to allow the central server 13' to identify whether audio device message (e.g., the flickering mode) indicated by the first identification information matches the first audio device information for audio device confirmation. This is useful when a field of view of the central server 13' contains multiple audio devices at the same time.

After the central server 13' finishes the registering and recording audio devices, the central server 13' communicates with an acoustic host 73, which is coupled to all the audio devices for controlling the operation thereof, to send the recorded positions of every audio device in the operation area thereto. The acoustic host 73 confirms whether all the audio devices are respectively disposed at a predetermined suitable position (including specific speaker type at a specific predetermined position) to ensure the playing performance of the smart audio system 700. If anyone of the audio devices is not arranged or does not match at a suitable predetermined position, the acoustic host 73 gives a message or instruction, e.g., by words or pictures on a display or by sounds from at least one of the audio devices, to indicate the adjustment of the audio device position(s). In some aspects, if all the audio devices are arranged properly, the acoustic host 73 further gives another message indicating perfect setup. In one embodiment, the acoustic host 73 and the central server 13' form one host (e.g., the acoustic host 73 embedded in the central server 13' or vice versa) to control the operation of the smart audio system 700.

After the setup is accomplished, the acoustic host 73 (already knowing respective position of every audio device) controls the output power (e.g., for adjusting the stereophonic balance, but not limited to) of every audio device according to the user position. The output parameter that is adjustable according to the user position is previously determined and recorded in the acoustic host 73 (e.g., in memory thereof).

In one aspect, to detect the user position, each of the audio devices (or including the acoustic host 73 in some aspects) further includes an IR sensor or a motion sensor, and the smart audio system 700 includes a remote controller (or the host itself) further having an infrared light source emitting at a predetermined pattern. When a user holds the remote controller, the IR sensor of at least a part of the audio devices, e.g., 111'-114' detects and recognizes the predetermined pattern, and then transmits image frames to the acoustic host 73. The processor (e.g., DSP, MCU, CPU or the like) of the acoustic host 73 calculates a position of the user in the operation area based on the respective positon of images of the detected infrared light source in the image frames received from the audio devices. The method of calculating a position in a space according to multiple image frames captured from different viewing angles is known to the art, e.g., calculated by triangulation, and thus details thereof are not described. For example, the field of view of the IR sensor of every audio device have no overlapping or only have a little overlapping such that the acoustic host 73 determines the user position according to the image frame(s) that contains the image of the predetermined pattern.

In another aspect, to detect the user position, each of the audio devices (or including the acoustic host 73 in some aspects) further includes a far infrared (FIR) sensor or thermal sensor. The FIR sensor or thermal sensor of at least a part of the audio devices detects and recognizes a user, and then transmits thermal image to the acoustic host 73. The processor of the acoustic host 73 calculates a position of the user in the operation area based on the respective positon of the user in the thermal images received from the audio devices. The method of calculating a position in a space according to multiple thermal images captured from different viewing angles is known to the art, and thus details thereof are not described. For example, the field of view of every FIR sensor or thermal sensor of every audio device have no overlapping or only have a little overlapping such that the acoustic host 73 determines the user position according to the thermal image(s) that contains a user image.

In some aspects, the acoustic host 73 further identifies a user identity (or user ID in brief) to determine whether to prohibit playing predetermined audio content corresponding to the identified user ID. For example, at least one of the audio devices and the acoustic host 73 has a camera for capturing a face image of a user. The acoustic host 73 is embedded with a face recognition algorithm to recognize the user ID according to the captured face image. The prohibited audio content is previously set by operating the acoustic host 73. For example, if the acoustic host 73 identifies that the user ID includes a baby, the acoustic host 73 is prohibited playing noisy music, but not limited to.

In some aspects, the acoustic host 73 further identifies a user ID or a user state to determine whether to control one of the audio devices, e.g., 111'-114' to stop playing any sound according to the identified user ID or user state. For example, the first audio device 114' and the second audio device 112' are arranged in different rooms, and if the acoustic host 73 identifies the user ID of a baby or a user is sleeping (using sleeping detection algorithm) in the room of the first audio device 114', the acoustic host 73 controls the first audio device 114' stop generating sound but controls the second audio device 112' to continuously paly the appointed music or audio content.

In another aspect, the acoustic host 73 further identifies a user ID or a user state to play appointed music. For example, if the acoustic host 73 identifies the user ID of a baby or a user is sleeping, the acoustic host 73 controls the audio devices, e.g., 111'-114' to play light music.

Other undescribed operations of the smart audio system 700 are similar to those in the smart detection system 100 mentioned above.

In an alternative embodiment, the central server 13' identifies a speaker type of every audio device 111'-114', a user positon, a user ID and a user state according to audio data generated by multiple microphones, e.g., 721-724 shown in FIG. 7. For example, the smart audio system 700 includes multiple audio devices 71, an acoustic host 73, multiple microphones 721-724 and a central server 13', e.g., the multiple audio devices 71 and the acoustic host 73 form an audio system, and the microphones 721-724 and the central server 13' form a register and control system. More specifically, this alternative embodiment further includes multiple microphones 721-724, and the audio devices 71, the acoustic host 73 and the central server 13' are similar to the above embodiment.

As shown in FIG. 7, the multiple audio devices 111'-114' are arranged at different positions in a room, but not limited to those positions shown in FIG. 7. The acoustic host 73 is coupled to the multiple audio devices 111'-114' in a wired or wireless manner. In a scan mode, the acoustic host 73 sequentially controls each of the multiple audio devices 111'-114' (already powered on) to generate predetermined sound. For example, the acoustic host 73 controls the audio devices 111' to generate the predetermined sound for a first time interval, and then controls the audio devices 112' to generate the predetermined sound for a second time interval, and then controls the audio devices 113' to generate the predetermined sound for a third time interval, and then controls the audio devices 114' to generate the predetermined sound for a fourth time interval. The predetermined sound is preferably set to present clearly the frequency parameter of every audio device, e.g., woofer or tweeter, but not limited to.

The multiple microphones 721-724 are arranged in the room to receive the predetermined sound generated by the multiple audio devices 111'-114' to respectively generate audio data. In one aspect, each of the multiple audio devices 111'-114' is arranged adjacent to one of the multiple microphones 721-724, as shown in FIG. 7, such that when one audio device generates the predetermined sound, the microphone adjacent thereto can receive the largest sound. In one embodiment, the positions of the microphones 721-724 are also registered and recorded using the same method as recording the sensor or audio device as mentioned above, i.e., the sensor 21 or the audio device 71 is replaced by a microphone which also includes a transceiver, an indicator and a processor.

In another aspect, the multiple microphones 721-724 are directional microphones and respectively directed toward the multiple audio devices 111'-114', e.g., not necessary adjacent thereto. For example, the microphone 721 is directed toward the audio device 111' to have the highest sensitive to the sound generated by the audio device 111'. The microphone 722 is directed toward the audio device 112'; the microphone 723 is directed toward the audio device 113'; and the microphone 724 is directed toward the audio device 114', but not limited thereto.

The central server 13' is coupled to the multiple microphones 721-724 in a wired or wireless manner. The central server 13' determines a speaker type (e.g., a frequency parameter of the speaker 713 such as a woofer or a tweeter, but not limited to) and a position of each of the multiple audio devices 111'-114' according to the audio data received from the multiple microphones 721-724.

In the scan mode, the acoustic host 73 informs, e.g., by wireless data, the central server 13' a current audio device that is controlled to generate the predetermined sound. For example, when the audio device 111' is controlled to generate the predetermined sound, the acoustic host 73 informs the central server 13' to let the central server 13' know current predetermined sound is generated from the audio device 111'. Then, the central server 13' identifies the speaker type of the audio device 111' by analyzing the audio data (e.g., converting the audio data to frequency domain to obtain the frequency band, but not limited to) generated by the microphone 721, which receives largest sound for example. The central server 13' further marks a position of the audio device 111' in the operation area being associated with the microphone 721, whose position is already known to the central server 13'. In this way, after a round of controlling different audio devices to generate the predetermined sound and informing the central server 13' regarding the current audio device, the central server 13' records the speaker type and the position corresponding to every audio device according to the audio data sequentially generated by the audio devices.

That is, in the scan mode, the central server 13' registered and recorded the speaker type and position of every audio device in the room (e.g., operation area) to be stored in a memory thereof according to the sound generated by the audio device. In some aspects, the central server 13' further sends information containing the recorded speaker type and the recorded position of each of the multiple audio devices to the acoustic host 73 to be stored in a memory of the acoustic host 73. The acoustic host 73 further confirms whether all the audio devices are respectively disposed at a predetermined position in the case that the audio devices should be arranged at a predetermined spatial relationship with one another to have optimum performance. For example, a tweeter is considered to be arranged at a distance or height with respect to a listener different from a distance or height between a woofer and the listener. These distances and heights are previously recorded and stored in the acoustic host 73 to be compared with the information from the central server 13'.

If any of the audio devices is not arranged at a predetermined suitable position, the acoustic host 73 gives a screen message or instruction on a display (e.g., integrated with or separated from the acoustic host 73) or a sound message or instruction via the multiple audio devices thereof to inform the user to rearrange the positions of the multiple audio devices. After the central server 13' has recorded the speaker type and the position of all the multiple audio devices, a scan mode or a setup stage is ended and an operation mode is entered.

In the operation mode, the multiple microphones 721-724 are turned on to receive user's sound from a user to generate speech data (or voice data). The central server 13' determines a user position according to the speech data generated by the multiple microphones 721-724. For example in one aspect, the central server 13' determines the user position according to the method mentioned in FIG. 5A. In other aspect, the central server 13' further includes or is coupled with an IR sensor, a FIR sensor or a thermal sensor to determine the user position as mentioned above. The central server 13' further sends information containing the user position to the acoustic host 73. The acoustic host 73 further controls output power of the multiple audio devices 111'-114' corresponding to the received user position to obtain a better performance, e.g., obtaining better stereophonic balance. For example, if the user is identified to be closer to the audio devices 112' and 113' and farther from the audio devices 111' and 114', the acoustic host 73 controls the audio devices 112' and 113' to generate a smaller sound and controls the audio devices 111' and 114' to generate a larger sound.

In some aspects, the central server 13' further identifies a user ID according to speech data generated by the multiple microphones 721-724, e.g., according to a voiceprint or a voice command of a user. For example, in order to identify the user ID, the central server 13' is embedded with an algorithm including voiceprint analyzer to analyze the user voiceprint, or embedded with a voice assistant to recognize the words or language (i.e., voice command) said by a user. In other aspects, the central server 13' has a camera for the face recognition to identify the user ID. The central server 13' further sends information containing the user ID to the acoustic host 73. The acoustic host 73 then prohibits playing predetermined audio content corresponding to the identified user ID. For example, when a first user ID is identified, the light music is player, and when a second user ID is identified, the classic music is played, but not limited to. The prohibited content is set previously by the family member.

In some aspects, the central server 13' identifies a user ID or a user state according to the speech data or voice data generated by the multiple microphones 721-724. The user state is, for example, a sleeping state. The method of identifying a user ID has be illustrated above. The central server 13' is able to identify, for example, the snore made by a user according to the voice data generated by the microphones. The central server 13' sends information containing the user ID or the user state to the acoustic host 73. The acoustic host 73 controls at least one of the multiple audio devices to stop generating sound according to the identified user ID or the identified user state. For example, in the case that the multiple audio devices 111'-114' are arranged at different rooms, and when the central server 13' identifies a baby or a sleeping person in the bedroom, the central server 13' informs the acoustic host 73 to control the audio device arranged in the bedroom to stop generating sound but controls other audio devices in other rooms to continuously play music.

In the present disclosure, the central server 13' identifies a user ID and a user position using image frames, thermal images, voiceprint or a voice command based on which kind of sensors are employed by a smart system of the present disclosure. The central server 13' and the acoustic host 73 have a predetermined communication protocol to communicate wireless data and information including the speaker type, the user position and the user ID. The connection information between the central server 13' and the acoustic host 73 is recorded and stored in a setup stage such that each time the central server 13' and the acoustic host 73 are powered on, the connection is automatically constructed to be ready to transmit the wireless data and information therebetween.

In other aspects, the embodiment of FIGS. 1-2 and the embodiment of FIGS. 7-8 are combined to form a smart home. That is, a central server is used to record and register the model and position of every sensor and speaker in an operation area, and perform corresponding control according a user position, a user ID and/or a user state.

As mentioned above, various sensors are necessary in the smart home, and how to automatically identify the sensor which is related to an event is one requirement to realize the accurate control. Accordingly, the present disclosure provides a smart detection system (e.g., FIGS. 2 and 6A) and an operating method thereof (e.g., FIG. 4B) that accurately identify an event position when an event occurs using a central server to communicate with every sensor previously for recording its position and model. When the central server simultaneously receives multiple event signals associated with a same event, the event position is determined according to signal strengths and/or a time sequence of receiving the multiple event signals (e.g., FIG. 5B). In addition, the central server predicts to turn on/off a home appliance by learning the operation rule of a user to realize the automatic control (e.g., FIG. 6B).

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A smart audio system, comprising:
   multiple audio devices arranged at different positions in a room;
   an acoustic host, coupled to the multiple audio devices, and configured to sequentially control each of the multiple audio devices to generate predetermined sound;
   multiple microphones arranged in the room to receive the predetermined sound generated by the multiple audio devices to respectively generate audio data; and
   a central server coupled to the multiple microphones to determine a speaker type and a position of each of the multiple audio devices according to the audio data associated with the predetermined sound and generated by the multiple microphones.

2. The smart audio system as claimed in claim 1, wherein each of the multiple audio devices is arranged adjacent to one of the multiple microphones.

3. The smart audio system as claimed in claim 1, wherein the multiple microphones are directional microphones and respectively directed toward the multiple audio devices.

4. The smart audio system as claimed in claim 1, wherein
   the acoustic host is configured to inform, by wireless data, the central server a current audio device that is controlled to generate the predetermined sound, and
   the central server is configured to record the speaker type and the position corresponding to the current audio device according to the audio data.

5. The smart audio system as claimed in claim 1, wherein the speaker type comprises a frequency parameter of a speaker included in each of the multiple audio devices.

6. The smart audio system as claimed in claim 1, wherein after the central server recorded the speaker type and the position of all the multiple audio devices,
   the central server is further configured to send information containing the recorded speaker type and the recorded position of each of the multiple audio devices to the acoustic host, and the acoustic host is further configured to confirm whether all the audio devices are respectively disposed at a predetermined position.

7. The smart audio system as claimed in claim 6, wherein the central server is further configured to determine a user position according to speech data generated by the multiple microphones based on user's sound, and send information containing the user position to the acoustic host; and the acoustic host is further configured to control output power of the multiple audio devices corresponding to the received user position.

8. The smart audio system as claimed in claim 6, wherein the central server is further configured to identify a user ID according to speech data generated by the multiple microphones based on user's sound, and send information containing the user ID to the acoustic host; and the acoustic host is further configured to prohibit playing predetermined audio content corresponding to the identified user ID.

9. The smart audio system as claimed in claim 8, wherein the central server is configured to recognize the user ID according to a voiceprint or a voice command of a user.

10. The smart audio system as claimed in claim 6, wherein the central server is further configured to identify a user ID or a user state according to the speech data generated by the multiple microphones based on user's sound, and send information containing the user ID or the user state to the acoustic host; and the acoustic host is further configured to control at least one of the multiple audio devices to stop generating sound according to the identified user ID or the identified user state.

11. The smart audio system as claimed in claim 1, wherein the central server is configured to analyze the audio data by converting the audio data to frequency domain to obtain a frequency band to determine the speaker type.

12. A smart audio system, comprising:

multiple audio devices, arranged at different positions in a room, and each being configured to generate predetermined sound;

an acoustic host, coupled to the multiple audio devices, and configured to confirm whether all the audio devices are arranged at a predetermined spatial relationship with one another;

multiple microphones arranged in the room to receive the predetermined sound generated by the multiple audio devices to respectively generate audio data; and a central server coupled to the multiple microphones to determine a speaker type and a position of each of the multiple audio devices according to the audio data received from the multiple microphones.

13. The smart audio system as claimed in claim 12, wherein each of the multiple audio devices is arranged adjacent to one of the multiple microphones.

14. The smart audio system as claimed in claim 12, wherein the multiple microphones are directional microphones and respectively directed toward the multiple audio devices.

15. The smart audio system as claimed in claim 12, wherein the speaker type comprises a frequency parameter of a speaker included in each of the multiple audio devices.

16. The smart audio system as claimed in claim 12, wherein the acoustic host is further configured to inform, by wireless data, the central server a current audio device that is generating the predetermined sound, and the central server is configured to record the speaker type and the position corresponding to the current audio device according to the audio data, and send information containing the recorded speaker type and the recorded position of each of the multiple audio devices to the acoustic host.

17. The smart audio system as claimed in claim 16, wherein the central server is further configured to determine a user position according to speech data generated by the multiple microphones based on user's sound, and send information containing the user position to the acoustic host; and the acoustic host is further configured to control output power of the multiple audio devices corresponding to the received user position.

18. The smart audio system as claimed in claim 16, wherein the central server is further configured to identify a user ID according to speech data generated by the multiple microphones based on user's sound, and send information containing the user ID to the acoustic host; and the acoustic host is further configured to prohibit playing predetermined audio content corresponding to the identified user ID.

19. The smart audio system as claimed in claim 18, wherein the central server is configured to recognize the user ID according to a voiceprint or a voice command of a user.

20. The smart audio system as claimed in claim 16, wherein the central server is further configured to identify a user ID or a user state according to the speech data generated by the multiple microphones based on user's sound, and send information containing the user ID or the user state to the acoustic host; and the acoustic host is further configured to control at least one of the multiple audio devices to stop generating sound according to the identified user ID or the identified user state.

\* \* \* \* \*